(12) United States Patent
Kock

(10) Patent No.: US 8,249,747 B2
(45) Date of Patent: Aug. 21, 2012

(54) ROBOT SAFETY SYSTEM AND A METHOD

(75) Inventor: Soenke Kock, Schriesheim (DE)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 13/131,267

(22) PCT Filed: Dec. 3, 2008

(86) PCT No.: PCT/EP2008/066726
§ 371 (c)(1),
(2), (4) Date: Jun. 28, 2011

(87) PCT Pub. No.: WO2010/063319
PCT Pub. Date: Jun. 10, 2010

(65) Prior Publication Data
US 2011/0264266 A1 Oct. 27, 2011

(51) Int. Cl.
*G05B 19/04* (2006.01)
*G05B 19/18* (2006.01)

(52) U.S. Cl. ... 700/253; 700/245; 700/255; 318/568.11; 318/568.12; 318/568.16; 901/1; 901/2; 901/9; 901/46; 901/47

(58) Field of Classification Search ............... 700/245, 700/253, 255; 901/1, 2, 9, 10, 46, 47; 318/568.11, 318/568.12, 568.16
See application file for complete search history.

(56) References Cited

U.S. PATENT DOCUMENTS

| 7,558,647 B2 * | 7/2009 | Okazaki ............ 700/260 |
| 2006/0049939 A1 | 3/2006 | Haberer et al. |
| 2008/0161970 A1 | 7/2008 | Adachi et al. |
| 2009/0105880 A1 * | 4/2009 | Okazaki ............ 700/258 |
| 2009/0171505 A1 * | 7/2009 | Okazaki ............ 700/258 |

FOREIGN PATENT DOCUMENTS

| DE | 10320343 A1 | 12/2004 |
| DE | 10324627 A1 | 1/2005 |
| DE | 102006048166 A1 | 2/2008 |
| WO | WO2010063319 A | 6/2010 |

* cited by examiner

*Primary Examiner* — Khoi Tran
*Assistant Examiner* — Jamie Figueroa
(74) *Attorney, Agent, or Firm* — Seppo Laine Oy; Joshua P. Wert

(57) ABSTRACT

A robot safety system configured to protect humans in the vicinity of a working robot (1, 11, 21, 31) against harmful impacts by said robot (1, 11, 21, 31), said safety system comprising a sensor system (3, 13, 23) and a safety controller (4, 14, 24) configured to establish an impact risk profile of the robot (1, 11, 21, 31) and deliver an operating signal to a robot controller (2, 12, 22) based on said impact risk profile, wherein the safety controller (4, 14, 24) is configured to establish the impact risk profile based on stored data and input signals, and that the stored data and input signals comprise stored impact data, stored data related to the path of the robot (1, 11, 21, 31), and signals from the sensor system of events in the vicinity of the robot (1, 11, 21, 31), such as a detected human (P1, P11, P21, P22, P31, P32) in the vicinity of the robot (1, 11, 21, 31).

20 Claims, 2 Drawing Sheets

ROBOT SAFETY SYSTEM AND A METHOD

FIELD OF THE INVENTION AND PRIOR ART

The invention relates to a robot safety system according to the preamble of claim 1 and a method for protecting humans coming close to a working robot against harmful impacts by the robot according to the preamble of claim 15.

A robot in work can be extremely harmful to humans working or moving in the vicinity of the robot, especially if the robot is heavy and moves with a high speed, which is often the case. There can be several reasons for humans to be in the vicinity of the working robot; they can be there by mistake and they can be there to perform service on the robot or on devices in the vicinity to the robot. Humans can also be working co-operatively with the robot, for instance side by side with the robot at a conveyor belt.

Today it is common to have a fence or a cage around the robot for protecting people against harmful impacts by the robot. When a person enters the fenced or caged area one of the following two protective actions usually occurs:
  1. The robot turns off
  2. The robot is operated in a safety-mode, which for small robots implies that the robot works with a maximum effect of 80 W and for large robots it implies that the robot moves with a speed not higher than 250 mm/s. The person entering the area is also carrying a dead man's switch for being able to rapidly stop the robot in the case of emergency.

The above mentioned precautions do work well and not many people are getting harmed by working robots. However, the present precautions always result in production loss and are costly for the industry, therefore there is a need for more optimized safety systems.

SUMMARY OF THE INVENTION

The objective of the present invention is to provide a new and favourable robot safety system as well as a new and favourable method for protecting humans coming close to a working robot against harmful impacts by the robot.

This objective is according to the invention achieved by means of a robot safety system having the features defined in claim 1 and a method having the features defined in claim 15.

In the prior art the robot safety systems did not take into account the degree of harm from a potential impact from a robot on a person. The degree of harm depends on a variety of parameters, such as:
  which part of the robot actually is hitting the person,
  if the robot carries a potentially harmful tool,
  the speed and weight of the robot hitting the person, and
  which part of the person that receives the hit.

If for instance a person gets hit on his lower arm by a non-edgy part of the robot the impact would not do a significant amount of harm to the person. If instead an edge of the robot hits the person in the head or in an eye a significant amount of harm could occur. Also according to the invention, a person's intentions in the vicinity of the robot are taken into account by processing signals from the sensor system of events in the vicinity of the robot. If a person is entering an area in the vicinity to the robot, the safety system analyses the intensions of the human and correlate that with stored data related to the path of the robot. The likelihood for a collision between the robot and the person can thus be calculated and the robot is ordered by the robot safety system to operate to adjust the risk for collision, or at least to adjust the potential harm that can be done to the person. By basing the impact risk profile upon the above mentioned stored data and input signals the present invention optimizes the safety and makes it possible for the robot to continue working as efficiently as possible although humans are present in the vicinity to the robot.

According to an embodiment of the invention the safety controller is configured to deliver the operating signal to the robot controller which is configured to adjust the operating mode, e.g. adjust the speed of the robot so as to adjust the risk for harmful impacts on a human in the vicinity of the robot. The adjusting of operating mode of the robot can also comprise emitting of an alarm signal while the robot continues to work in full speed and it can comprise a full stop of the robot. The adjustment of the operating mode is dependent upon the impact risk profile. This way, unnecessary working stops can be avoided and economical losses because of working stops can be minimized.

According to another embodiment of the invention the stored impact data comprises physical data about the robot, such as weight, texture, geometry etc. The physical data about the robot affects the potential harm said robot can do on a person being hit by said robot. A sharp edge of a heavy robot is likely to do more harm to a human than a soft flat surface of a light robot. By taking the physical data about the robot into account an accurate impact risk profile can be established.

In this description and in the subsequent claims the term "accurate impact risk profile" not only refer to the risk for a person in the vicinity of a robot being hit by said robot, but also to the actual harm that the person suffers if it is hit. The impact risk profile takes both these aspects into account. A person being hit on soft tissue by a non-edgy part of a robot does not suffer as much harm as if said person was hit in the head by a edgy part of the robot.

According to another embodiment of the invention the stored impact data comprises physical data, such as weight, texture, geometry etc, about a tool carried by the robot. The tool carried by the robot can in many cases be more harmful than the robot itself. The physical data about the tool affects the potential harm said tool can do on a person being hit by said tool. A sharp edge of a tool is likely to do more harm to a human than a soft flat surface of the same tool. By taking the physical data about the tool into account an accurate impact risk profile can be established.

According to another embodiment of the invention the stored impact data comprises a map over the robot with impact values for at least some of the robot parts, the impact values being based on the degree of harm on a human being hit by said parts. Some parts of the robot are more harmful than other parts to a human. For instance, a sharp tool in the hand of the robot is more harmful than a slowly moving body part of the same robot. By taking the map over the robot with impact values for at least some of the robot parts into account an accurate impact risk profile can be established.

According to another embodiment of the invention the stored impact data comprises a map over a human with harm values for at least some of the parts of the body of the human, the harm values being based on the degree of harm on said parts of the body of the human being hit by the robot. Some parts of a human body are of course more sensitive than other parts. The degree of harm done to a human by being hit by a robot in the eye is significantly higher than the degree of harm done by being hit on for instance the leg by the same part of the robot. By taking the map over a human with harm values for at least some of the parts of the body of the human into account an accurate impact risk profile can be established.

According to another embodiment of the invention the stored data on the path of the robot comprises data on:

the location of the robot at any given time,
the speed of the robot at any given time, and
the orientation of the robot at any given time.

The prediction on if a collision between the robot and a human in the vicinity of the robot is likely is facilitated if the safety system has access to the above mentioned data. By having access to the above data the safety system can also take into account which part of the robot that is likely to hit the human and at which speed the collision is to take place. By taking the above data into account an accurate impact risk profile can be established.

According to another embodiment of the invention the sensor system comprises at least one optical sensor. An optical sensor is ideal for surveying an area in the vicinity to the robot. The optical sensor can of course be of any kind, such as a camera working in the visibly region of the spectrum, but also a camera working in the infra red region. The optical sensor can also comprise a time-of-flight system, such as a laser scanner.

According to another embodiment of the invention the optical sensor is configured to survey an area in the vicinity to the robot with respect to the position, moving direction and moving speed of humans entering or working in said area. If a person enters the area in the vicinity to the robot an accurate impact risk profile can be established if the safety system takes the position, moving direction and moving speed of the person into account, since all those parameters affect the likelihood of a collision between the person and the robot.

According to another embodiment of the invention the sensor system is configured to divide said area into zones based on the distance to the robot and send signals to said safety controller based on in which zone humans are detected. Different zones can be established in the vicinity to the robot and based on in which of these zones a human is located different operating signals to a robot controller are sent. If a human is located in a zone relatively far away from the robot the safety system can regard the event as not dangerous for said human if the human for instance is moving in a direction away from the robot in a relatively slow speed. If instead the human detected in the same zone runs towards the robot the safety system can take the decision to stop the robot. A detected person in a zone very close to the robot does not necessarily mean an increased risk for harmful impacts on the human if the robot is configured to work co-operatively with humans. Such a person can by the safety system be regarded as a co-worker and the robot can continue to work at full speed. If certain zones are defined with regard to the risk for harmful impact to a human being in the respectively zone an accurate impact risk profile can be established.

According to another embodiment of the invention the optical sensor is configured to survey the area in the vicinity to the robot with respect to the position, moving direction and moving speed of the parts of the body of a human entering or working in said area independently. Some parts of a human body are more sensitive than other parts. As already said the degree of harm done to a human by being hit by a robot in the eye is significantly higher than the degree of harm done by being hit on for instance the leg, by the same part of the robot. If the different parts of the human, such as legs, arms, head etc, are treated independently the safety system can established a more accurate impact risk profile for a human entering an area in the vicinity of the robot.

According to another embodiment of the invention the safety system comprises processor means configured to calculate an impact risk profile based on the stored data and input signals. Processor means can perform the necessary calculations to calculate an accurate impact risk profile.

According to another embodiment of the invention the impact risk profile comprises a first part consisting of the actual risk for impact based on:
the location of the robot at any given time,
the speed of the robot at any given time,
the orientation of the robot at any given time, and
the position, moving direction and moving speed of humans in the vicinity to the robot.

By basing the first part of the impact risk profile upon the above mentioned parameters the probability for a collision between the robot and a human being in the vicinity to the robot can be accurately calculated. This probability is together with other parameters then used by the safety system to decide how an operating signal to the robot controller is to be formulated.

According to another embodiment of the invention the impact risk profile comprises a second part consisting of the degree of harm a person being subjected to an impact from the robot is exposed to, based on:
the speed and the orientation of the robot,
physical data about the robot, such as weight, texture, geometry etc,
a map over the robot with impact values for at least some of the robot parts, the impact values being based on the danger for a human to be hit by said parts, and
a map over a human with harm values for at least some of the parts of the body of the human, the harm values being based on the harm that can be done by an impact on said parts of the body of the human.

By basing the second part of the impact risk profile upon the above mentioned parameters the potential degree of harm a person being subjected to an impact from the robot can be accurately calculated. This calculated degree of harm is together with other parameters then used by the safety system to decide how an operating signal to the robot controller is formulated.

Embodiments of the method of the invention are obvious from the dependent method claims and the above description.

Other advantages and advantageous features of the invention will appear from the other dependent claims and the subsequent description.

BRIEF DESCRIPTION OF THE DRAWINGS

With reference to the appended drawings, below follows a specific description of embodiments of the invention cited as examples.

In the drawings.

DETAILED DESCRIPTION OF PREFERRED EMBODIMENTS OF THE INVENTION

Explained herein are preferred embodiments of the invention, describing a robot safety system and a method for protecting humans coming close to a working robot against harmful impacts by the robot. The invention may, however, be embodied in many different forms and should not be construed as being limited to the exemplary embodiments set forth herein; rather, these embodiments are provided so that this disclosure will be thorough and complete, and will fully convey the concept of the invention to those skilled in the art.

Figure 1:
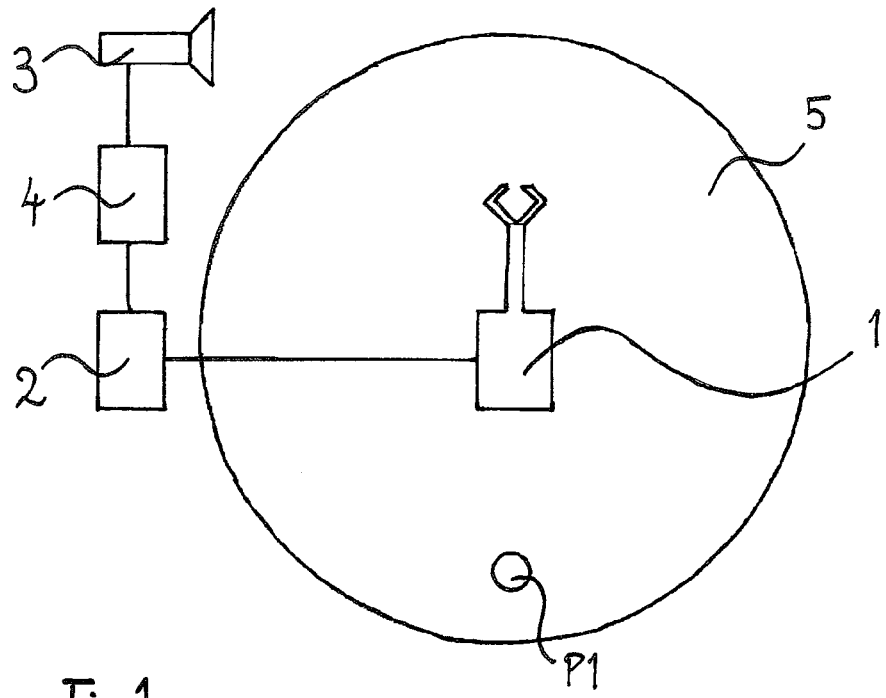
FIG. 1 shows a robot with a robot safety system according to the invention.

FIG. 1 shows a working robot 1 with a robot controller 2 and a robot safety system according to the invention. Said robot safety system comprises a sensor system 3 and a safety controller 4. The safety system is configured to establish an impact risk profile of the robot 1 and deliver an operating signal to the robot controller 2 based on said impact risk profile. The safety controller 4 is configured to establish the impact risk profile based on stored data and input signals. The stored data and input signals comprise stored impact data, stored data related to the path of the robot 1, and signals from the sensor system 3 of events in the vicinity 5 of the robot 1, such as a detected human P1 in the vicinity 5 of the robot 1.

Figure 2:
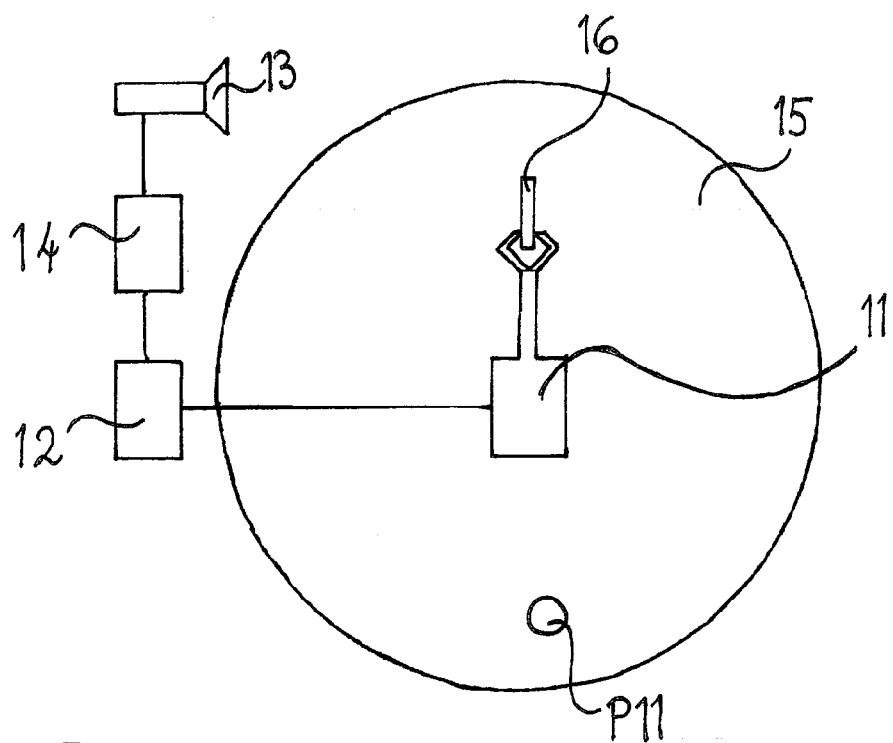
FIG. 2 shows a robot with another robot safety system according to the invention.

FIG. 2 shows another working robot 11 with a robot controller 12 and a robot safety system according to the invention. Said robot safety controller 14 comprises a sensor system 13 and a safety controller 14. The safety system is configured to establish an impact risk profile of the robot 11 and deliver an operating signal to a robot controller 12 based on said impact risk profile. The impact risk profile is based upon stored data and input signals comprising stored impact data, stored data related to the path of the robot 11, comprising data on the location of the robot 11, the speed of the robot 11 and the orientation of the robot 11 at any given time, and signals from the sensor system 13 of events in the vicinity 15 of the robot 11, such as a detected human P11 in the vicinity 15 of the robot 11. The safety controller 14 is configured to deliver the operating signal to the robot controller 12 which is configured to adjust the operating mode, e.g. adjust the speed, of the robot 11 so as to adjust the risk for harmful impacts on the human P11 in the vicinity 15 of the robot 11. The stored impact data comprises physical data about the robot 11 and about a tool 16 carried by the robot 11. The physical data of the robot 11 or the tool 16 can be any physical data, such as weight, texture and geometry etc. The stored impact data also comprises a map over the robot 11 with impact values for at least some of the robot parts, the impact values being based on the degree of harm on the human P11 being hit by said parts, and a map over the human P11 with harm values for at least some of the parts of the body of the human P11, the harm values being based on the degree of harm on said parts of the body of the human P11 being hit by the robot 11.

Figure 3:
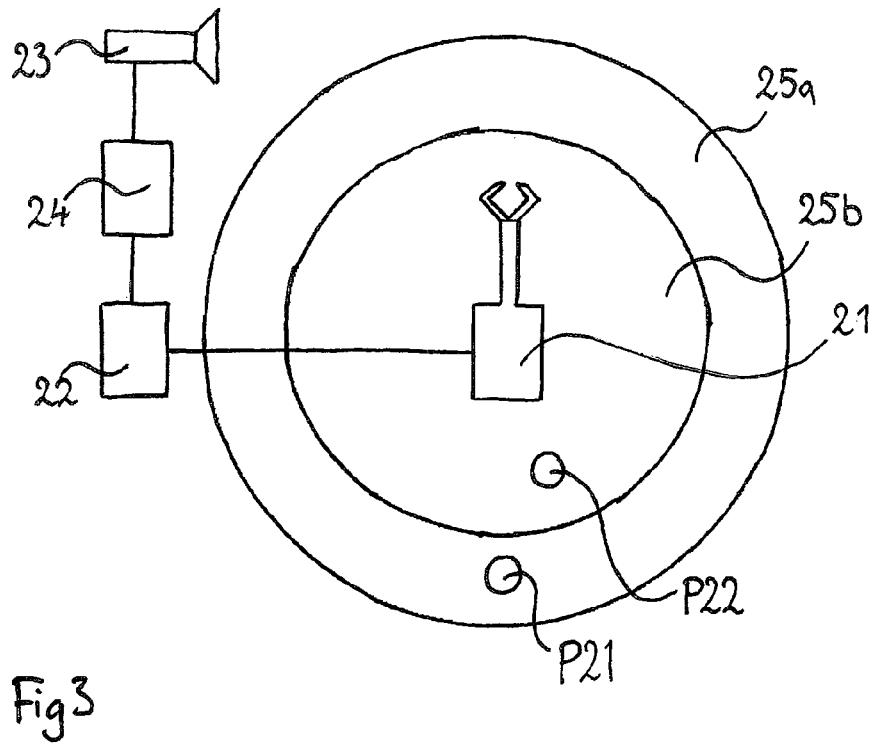
FIG. 3 shows a robot with another robot safety system according to the invention.

FIG. 3 shows another working robot 21 with a robot controller 22 and a robot safety system according to the invention. Said robot safety system comprises a sensor system 23 and a safety controller 24. The safety controller 24 is configured to establish an impact risk profile of the robot 21 and deliver an operating signal to a robot controller 22 based on said impact risk profile. The impact risk profile is based upon stored data and input signals comprising stored impact data, stored data related to the path of the robot 21, and signals from the sensor system 23 of events in the vicinity of the robot 21, such as a detected human P21, P22 in the vicinity of the robot 21. The sensor system 23 comprises at least one optical sensor configured to survey an area in the vicinity to the robot 21 with respect to the position, moving direction and moving speed of humans P21, P22 entering or working in said area. Said area being divided into zones 25a, 25b based on the distance to the robot 21 and signals send to said safety controller 24 are based on in which zone 25a, 25b humans P21, P22 are detected. If for instance a first person P21 is detected in a first zone 25a, said first zone 25a being located relatively far away from the robot 21, and said first person P21 is moving in a direction away from the robot 21, the impact risk profile established by the safety controller 24 tells the safety system that the risk for impact between the first person P21 and the robot 21 is relatively low. The operating signal delivered to the robot controller 22 from the safety controller 24 orders the robot controller 22 to slightly decrease the working speed of the robot 21 to adjust the risk for a harmful impact on said first person P21 from the robot 21. A second person P22 is moving quickly towards the robot 21 and is detected moving into a second zone 25b, which is located closer to the robot 21 compared to the first zone 25a. Since the second person P22 is moving fast and directly towards the robot 21, the operating signal delivered to the robot controller 22 from the safety controller 24 orders the robot controller 22 to fully stop the robot 21 to adjust the risk for a harmful impact on said second person P22 from the robot 21.

Figure 4:
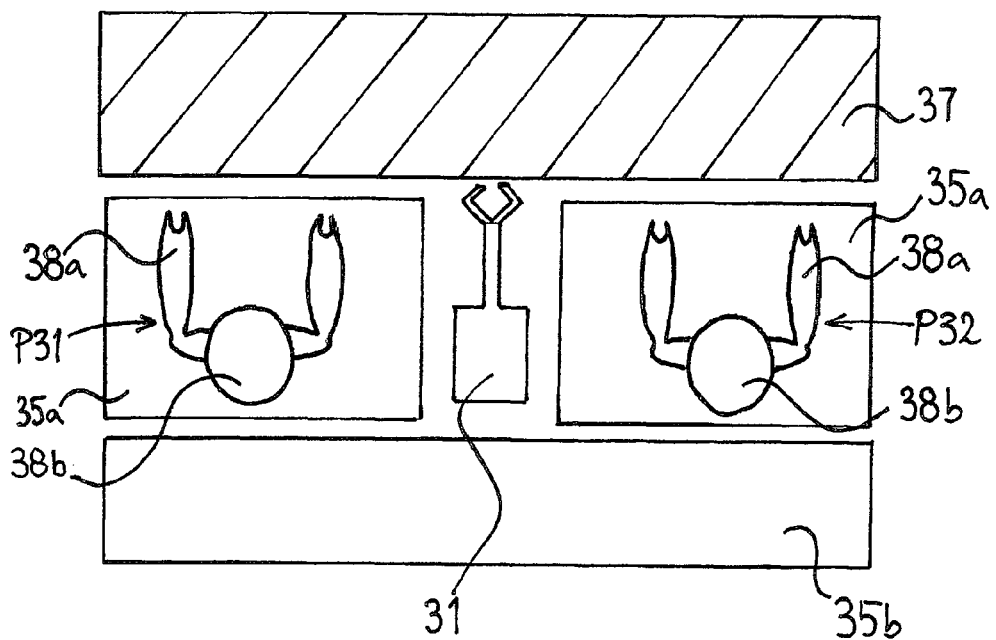
FIG. 4 shows a robot with another safety system according to the invention.

FIG. 4 shows a robot 31 with another safety system according to the invention. The robot 31 is configured to work co-operatively with humans P31, P32 at for instance a conveyor belt 37. An sensor system is configured to survey the area in the vicinity to the robot with respect to the position, moving direction and moving speed of at least some of the parts of the body 38a, 38b of the humans P31, P32 entering or working in said area independently. The area is divided into zones 35a, 35b. The parts of the body of the humans P31, P32 considered in this example are the arms 38a and the head 38b, of course other part of the body of the humans can be considered as well. The safety system in FIG. 4 takes into account that humans P31, P32 work in the vicinity to the robot 31 and as long as these humans P31, P32 behave normally the security system will not deliver an operating signal, which for instance order a decrease of the speed of the robot 31, to the robot controller. The zones 35a, in which the humans P31, P32 are working co-operatively with the robot, are thus considered to be safe zones, since the safety system takes into account that the humans P31, P32 are trained to work in the vicinity of the robot. However, due to the fact that the parts of the body 38a, 38b of the humans P31, P32 working in said zones 35a are treated independently, the safety system is always ready if anything unforeseen occurs. If for instance one of the humans P31, P32 moves his head 38b too close to the robot 31, safety precautions are initiated. The precautions can for instance be an alarm signal or a decrease in working speed of the robot 31. Another zone 35b behind the humans P31, P32 is usually considered to be a non-safe zone. Under regular work, no humans should enter this zone 35b and if so happens safety precautions will be taken by the safety system, of course by establishing the impact risk profile based on stored data and input signals.

The safety system can of course comprise more than one safety controller and sensor system working independently for a safer operation of said safety system. One or several of the safety controllers can also be an integrated part of the robot controller.

The invention is of course not in any way limited to the embodiments described above. On the contrary, several possibilities to modifications thereof should be apparent to a person skilled in the art without departing from the scope of the invention as defined in the appended claims.

The invention claimed is:

1. A robot safety system configured to protect humans in the vicinity of a working robot against harmful impacts by said robot, said safety system comprising;
    a sensor system,
    a safety controller configured to establish an impact risk profile of the robot based on stored data, data related to the path of the robot, and input signals from the sensor system of events in the vicinity of the robot, said events including a detected human in the vicinity of the robot, and to deliver an operating signal to a robot controller based on said impact risk profile, wherein said stored data includes a map over the robot with impact values for at least some of the robot's parts, said impact values being based on the degree of harm to a human being hit by said parts, and wherein said stored data further includes a map over a human with harm values for at least some of the parts of the body of the human, said harm values being based on the degree of harm on said parts of the body of the human being hit by the robot.

2. A robot safety system according to claim 1, wherein the safety controller is further configured to deliver the operating signal to the robot controller which is configured to adjust the operating mode so as to adjust the risk for harmful impacts on a human in the vicinity of the robot.

3. A robot safety system according to claim 1, wherein the stored impact data comprises physical data about the robot selected from the group of: weight, texture and geometry.

4. A robot safety system according to claim 1, wherein the stored impact data comprises physical data about a tool carried by the robot selected from the group of: weight, texture and geometry.

5. A robot safety system according to claim 1, wherein the stored data on the path of the robot comprises data on:
   the location of the robot at any given time,
   the speed of the robot at any given time, and
   the orientation of the robot at any given time.

6. A robot safety system according to claim 1, wherein the sensor system comprises at least one optical sensor.

7. A robot safety system according to claim 6, wherein the optical sensor is configured to survey an area in the vicinity to the robot with respect to the position, moving direction and moving speed of humans entering or working in said area.

8. A robot safety system according to claim 7, wherein the sensor system is configured to divide said area into zones based on the distance to the robot and send signals to said safety controller based on in which zone humans are detected.

9. A robot safety system according to claim 6, wherein the optical sensor is configured to survey the area in the vicinity to the robot with respect to the position, moving direction and moving speed of the parts of the body of a human entering or working in said area independently.

10. A robot safety system according to claim 1, wherein the safety system comprises a processor means configured to calculate an impact risk profile based on the stored data and input signals.

11. A robot safety system according to claim 1, wherein the impact risk profile comprises a portion consisting of the actual risk for impact based on:
   the location of the robot at any given time,
   the speed of the robot at any given time,
   the orientation of the robot at any given time, and
   the position, moving direction and moving speed of humans in the vicinity to the robot.

12. A robot safety system according to claim 1, wherein the impact risk profile comprises a portion consisting of the degree of harm a human being subjected to an impact from the robot is exposed to based on:
   the speed and the orientation of the robot,
   physical data about the robot,
   a map over the robot with impact values for at least some of the robot parts, the impact values being based on the danger for a human to be hit by said parts, and
   a map over a human with harm values for at least some of the parts of the body of the human, the harm values being based on the harm that can be done by an impact on said parts of the body of the human.

13. A method for protecting humans coming close to a working robot against harmful impacts by the robot said method comprising the steps of;
   sensing parameters influencing risk of occurrence of said harmful impacts,
   calculating an impact risk profile on the basis of said parameters sensed, stored data related to the path of the robot, and signals from a sensor system of events in the vicinity of the robot including a detected human in the vicinity of the robot,
   adapting said robot based on said impact risk profile,
   wherein said impact risk profile is established while considering stored impact data in the form of a map over the robot with impact values for at least some of the robot's parts, the impact values being based on the degree of harm on a human being hit by said parts, and stored impact data in the form of a map over a human with harm values for at least some of the parts of the body of the human, the harm values being based on the degree of harm on said parts of the body of the human being hit by the robot.

14. A method according to claim 13, wherein said adapting of said robot is performed by adjusting an operating mode of the robot so as to adjusting the risk for harmful impacts on a human in the vicinity of the robot.

15. A method according to claim 13, wherein said impact risk profile is established while considering stored impact data in the form of physical data about the robot selected from the group of: weight, texture and geometry.

16. A method according to claim 13, wherein said impact risk profile is established while considering stored impact data in the form of physical data about a tool carried by the robot selected from the group of: weight, texture and geometry.

17. A method according to claim 13, wherein said impact risk profile is established while considering stored impact data in the form of:
   the location of the robot at any given time,
   the speed of the robot at any given time, and
   the orientation of the robot at any given time.

18. A method according to claim 13, wherein said impact risk profile is established while considering signals from the sensor system in the form of signals from an optical sensor surveying an area in the vicinity to the robot with respect to the position, moving direction and moving speed of humans entering or working in said area.

19. A method according to claim 13, wherein said impact risk profile is established while considering signals from the sensor system in the form of signals from an optical sensor surveying an area in the vicinity to the robot with respect to the position, moving direction and moving speed of the parts of the body of a human entering or working in said area independently.

20. A method according to claim 13, wherein the operating signal delivered to the robot controller orders the robot controller to operate the robot in one of at least four operating modes based on the impact risk profile, said operating modes covers modes from full operational speed to full stop of the robot and various speed levels in between.

* * * * *